March 8, 1949.  R. C. DEHMEL  2,463,602
ROUGH AIR SIMULATING MEANS FOR
GROUNDED AIRCRAFT TRAINERS
Filed Sept. 12, 1946  3 Sheets-Sheet 1

INVENTOR.
Richard Carl Dehmel
BY
Orin R. Severn
ATTORNEY

INVENTOR.
Richard Carl Dehmel
BY
Orin R. Severn
ATTORNEY

Patented Mar. 8, 1949

2,463,602

UNITED STATES PATENT OFFICE 2,463,602

ROUGH AIR SIMULATING MEANS FOR GROUNDED AIRCRAFT TRAINERS

Richard Carl Dehmel, Summit, N. J.

Application September 12, 1946, Serial No. 696,401

10 Claims. (Cl. 35—12)

This invention relates to grounded aircraft trainers and particularly to apparatus for simulating in such trainers "rough air" conditions so as to produce physiological sensations encountered in actual flight.

It has been proposed to agitate or rock the pilot's cockpit station or seat of grounded or emplaced aircraft trainers by various means, such as electromagnets, pneumatic motors and the like for simulating flight conditions in a turbulent atmosphere where the aircraft may be abruptly displaced by inequalities in air density or movement and thus caused to change its angle of attack, direction of flight or even its altitude. In general, the prior art devices used for this purpose either fail to simulate actual conditions accurately and with sufficient realism, or they are comparatively complicated and expensive. An important consideration in the use of this type of equipment is that it be comparatively simple and rugged in construction so as to facilitate inspection and maintenance, and also that it operate in a random and unpredictable manner for producing the typical rough air sensations of "bumpiness" and instability.

An object of this invention therefore is to provide improved apparatus of the above character for simulating rough air conditions that is inexpensive, simple and rugged in construction and that is fully random in its operation for producing typical rough air sensations.

The invention will be more fully set forth in the following description referring to the accompanying drawings, and the features of novelty will be pointed out with particularity in the claims annexed to and forming a part of this specification.

Referring to the drawings, Fig. 1 is an elevational view partly broken away of a pilot's station of grounded aircraft trainer apparatus associated with apparatus for simultaing rough air conditions embodying the present invention;

Figure 1:
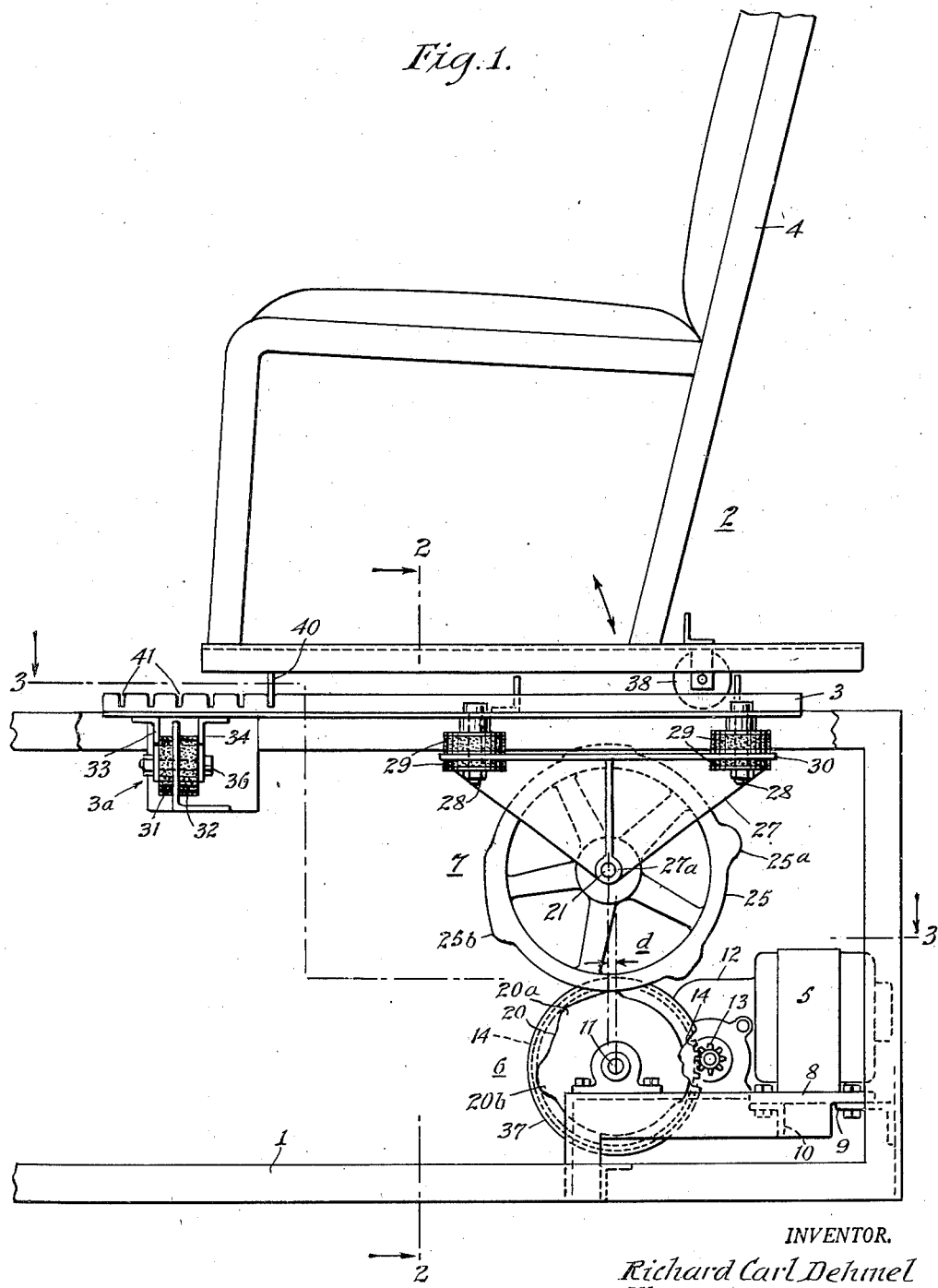

In general, the invention comprises a rectangular supporting frame 1 fabricated of angle and channel structural members, a pilot's station 2 consisting of a movable platform 3 and adjustable seat 4 mounted on the frame in proper relation to the simulated aircraft controls (not shown), an operating motor 5 that is energized for moving the platform so as to simulate rough air conditions and two sets of coacting cams 6 and 7 respectively for varying in a random manner the platform movement. One set of cams is driven from the motor 5 and the second set is driven by the first set and mounted for "free wheeling," i. e. free individual rotation, so that the free cams are casually driven so as to produce random relative movement between the sets of cams. This random movement is transmitted by one set of cams to the platform 3 of the pilot's station in a manner presently described so as to simulate rough air movement and induce in the pilot physiological sensations characteristic of those experienced in flight.

In practice various simulated aircraft controls, such as the stick, rudder and ailerons are carried by the frame but since they are not essential to an understanding of the present invention, a detailed disclosure thereof is omitted.

Figure 3:
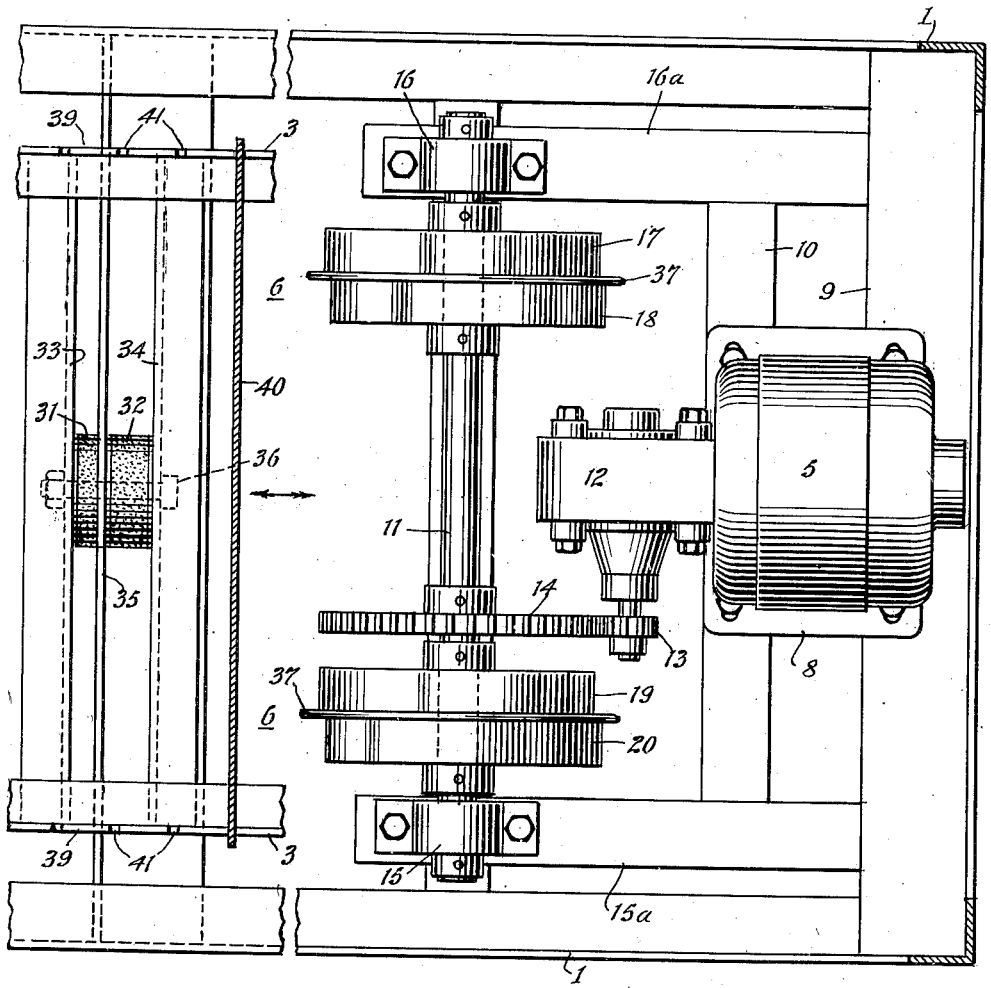
Fig. 3 is a plan view of the aforesaid apparatus taken along the line 3—3 of Fig. 1.

In the specific embodiment of my invention the base 8 of the motor is adjustably mounted on a fixed bracket 9 and shelf 10 secured to the main frame, Figs. 1 and 3. The motor is arranged to drive the cam shaft 11 for operating both sets of cams through a gear reduction mechanism 12, drive pinion 13 and a drive gear 14 secured to the shaft 11. The cam shaft is journalled in bearings 15 and 16 that are mounted on supporting flanges 15a and 16a secured to the frame, and carries the set of actuating cams 6 consisting of two pairs of dissimilar cams 17, 18 and 19, 20 respectively which are keyed or otherwise suitably secured to the shaft for rotation therewith. The cams of each pair are fixed in predetermined relation to each other by through-bolts or the like, and each cam has lobes such as 20a, 20b, etc. defining an irregular operating surface dissimilar to the other cam, a typical cam contour being shown by the cam 20, Fig. 1.

The platform assembly including the freewheeling cams is supported at its rear end on the set of actuating cams in floating relation to the frame and at its forward end for limited movement with respect to the frame by means of a single resilient connection 3a permitting a certain amount of rocking and tilting of the platform. The connection 3a is alined with the longitudinal central axis of the platform so that the platform can tilt and rock laterally about said axis as well as rotate or pitch about a transverse axis passing through said connection. Also the resilient connection allows a restricted longitudinal movement or sway of the platform.

Figure 2:
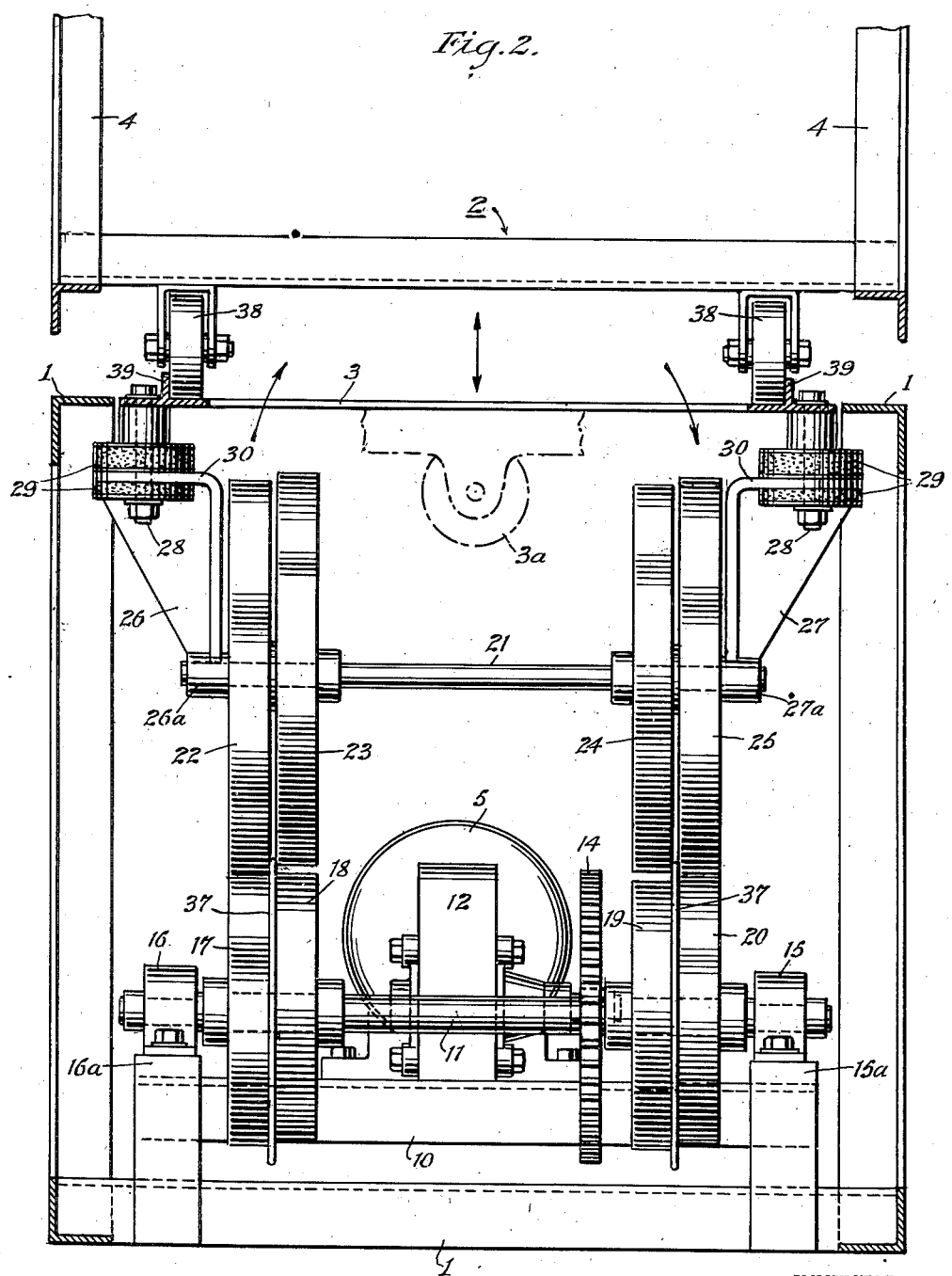
Fig. 2 is a similar view of the apparatus in elevation taken along the line 2—2 of Fig. 1.

The set of so-called free wheeling cams 7 driven by the actuating cams for moving the floating end of the platform assembly, Figs. 1 and 2, is also composed of two pairs of disc-like cams 22, 23 and 24, 25 respectively each cam having lobes such as 25a, 25b, etc. defining an irregular contour, although not necessarily differing from the others as in the case of the actuating cams. The cams of each free wheeling pair are adapted to ride on the corresponding actuating cams according to the cam design and are mounted for free rotation independently of each other on a spindle 21 secured to the seat platform at 26a and 27a respectively in bearing supports or brackets 26 and 27. The brackets are secured in depending relation to the seat platform 3 at opposite sides thereof and the platform is preferably resiliently mounted on the supporting brackets 26 and 27, such as by the suspension guide bolts 28 and rubber discs 29 between which the bracket supporting flange 30 is clamped. Alinement of the two sets of cams is maintained by a guiding flange or disc 37 mounted between the cams of each actuating pair so as to prevent overlapping of cam surfaces.

The resilient support 3a between the platform and frame, Figs. 1 and 3, comprises a pair of rubber discs 31 and 32 positioned between platform retaining flanges 33 and 34, the rubber discs in turn embracing a fixed flange 35 secured to the frame. The assembly is held in place by a through-bolt 36 and the alined apertures in the flanges for the through-bolt allow a certain amount of variable motion between the frame member 35 and the platform retaining members 33 and 34 for the tilting, rocking and pitching movement of the seat platform.

Figure 4:
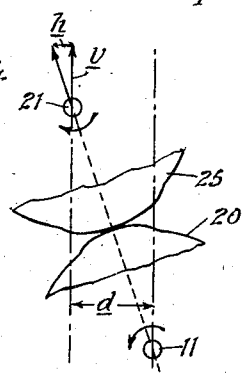
Fig. 4 is a diagrammatic view illustrating components of simulated rough air movement produced by the apparatus.

The motion imparted to the platform 3 by the sets of cams 6 and 7 is unpredictable and of random nature due to the casual operation of the free cams 22—25. The axes of the two sets of cams are in generally vertical relation, one above the other, and are preferably longitudinally displaced in either the forward or rear direction so as to produce a longitudinal pitching component $h$ in addition to the vertical component $v$ as diagrammatically shown by Fig. 4. This longitudinal pitching component can be varied as desired by varying the displacement $d$, or by varying the amount of flexibility of the resilient connection at 3a, or both.

It will therefore be seen that driving engagement between the cam set 6 and the cam set 7, such as between the cams 20 and 25, occurs for example when the cams 19 and 24 are out of engagement and the free cam 24 is coasting or idle; and that when a high point of cam 19 engages cam 24, or a low point of cam 20 causes the axis of the free cams to drop until cam 24 engages cam 19, the free cam 24 will then rotate and cam 25 will coast and idle until it is picked up again. Both free cams 24 and 25 are therefore casually engaged and rotated through varying angular distances as are also the free cams 22 and 23 with the result that a free cam may come to rest at any angular position thereof for a variable length of time. An orderly or predictable pattern of movement of either side of the pilot's station is therefore impossible. Accordingly the platform is tilted, rocked or pitched as indicated by the various direction arrows by both sets of cams in an unpredictable manner characteristic of rough air movement as the free cams alternately ride on the actuating cams and idle for irregular intervals.

The seat 4 is preferably adjustably mounted on its platform by any suitable means, such as for example rollers 38 guided along the channel members 39 forming sides of the platform 3. The seat may be held in adjusted position by a depending lug 40 arranged to fit in any one of a plurality of notches 41 formed in the angle members 39.

In operation, the motor 5 is energized whenever the instructor decides to introduce the rough air factor in the navigation problem before the pilot; or if the motor is automatically energized, whenever a "stall" or unstable condition obtains, or at random in the manner disclosed for example in my Patent No. 2,366,603 granted January 2, 1945, for "Aircraft training apparatus." The driving of the four actuating cams by the motor produces as above described a continuous tilting and oscillatory movement of the seat platform in an entirely random and novel manner.

It should be understood that this invention is not limited to specific details of construction and arrangement thereof herein illustrated, and that changes and modifications may occur to one skilled in the art without departing from the spirit of the invention.

What is claimed is:

1. In aircraft training apparatus, the combination of a motor operable for rough air simulation, a set of actuating cams driven from said motor, a second set of cams in respective alinement with said first set of cams and mounted for individual free wheeling, each of said free wheeling cams arranged to be in casual engagement and disengagement with and rotated at random by the corresponding actuating cam, a pilot's station supported on one of said sets of cams, the cams of both sets being irregularly related for causing casual relative movement between said sets of cams and a random movement of said station to simulate the movement of an aircraft under rough air conditions.

2. In aircraft training apparatus, the combination of a shaft supported for rotation about a fixed axis, a plurality of actuating cams driven from said shaft, a pilot's station provided with a plurality of cams each mounted for individual free wheeling respectively about an axis movable with said station, said free wheeling cams each arranged to be supported on and driven by a respective actuating cam and to disengage said cam, the lobes of at least some of said cams being irregularly and dissimilarly related so that a free cam may be out of driven engagement with its coacting driving cam while a companion free cam is in driven and station supporting engagement with its coacting driving cam thereby causing a random movement of said station to simulate the movement of an aircraft station under rough air conditions.

3. In aircraft training apparatus for simulating rough air conditions, the combination of a pilot's station, a pair of irregular cams mounted on said station for free rotation independently of each other, another pair of irregular cams mounted in spaced relation to said first-named pair on said station in like manner, a drive shaft operable for rough air simulation, and a pair of irregular cams driven from said shaft disposed beneath each pair of said free cams in alinement therewith for movably supporting said station arranged so that the upper and lower cams rotate in the same respective planes, and either cam of a pair of said free cams is in casual driven engagement with the corresponding driving cam for supporting said station at that point and producing a cam controlled random movement of the corresponding part of said station.

4. In aircraft training apparatus, the combination of a fixed base, a drive shaft supported from said base for rotation about a fixed axis, a plurality of discs each having a periphery of irregular contour driven from said shaft, a pilot's station provided with a plurality of discs similar to said first-named discs each mounted for individual free wheeling about an axis movable with said station, said free wheeling discs arranged to be supported on and driven by said first-named discs and also to be disengaged therefrom, the peripheral contours of all said discs being irregular so that a free disc is but casually engaged for discontinuous rotation thereof coincident with continuous rotation of its coacting actuating disc thereby causing a random movement of said station to simulate the movement of an aircraft station under rough air conditions.

5. In aircraft training apparatus for simulating rough air conditions, the combination of a pilot's station, a pair of rotatable irregular cams mounted on and at one side of said station for free rotation independently of each other, another pair of rotatable irregular cams mounted on and at the opposite side of said station in like manner, an operating motor, and a pair of rotatable irregular cams driven from said motor disposed beneath each pair of said free cams in respective alinement therewith for movably supporting said station, arranged so that either cam of a pair of said free cams may be in or out of driven and supporting engagement with the corresponding driving cam according to a casual relation between the opposing cam surfaces for producing a random movement of the corresponding side of said station.

6. In aircraft training apparatus for simulating rough air conditions, the combination of a frame, a platform mounted for limited movement in said frame and having a pilot's seat, a pair of irregular cams mounted beneath said platform at one side thereof for free rotation independently of each other, another pair of irregular cams also mounted beneath said platform in like manner at an opposite side, a fixed base having a motor operable for rough air simulation, and a pair of irregular cams mounted on said base and driven from said motor disposed beneath each pair of said free cams in alinement therewith for movably supporting said platform and arranged so that a driving cam may be in casual engagement with a respective free cam for producing a random movement of the corresponding side of said platform.

7. In aircraft training apparatus for simulating rough air conditions, the combination of a pilot's station, a set of irregular cams mounted in pairs for free rotation independently of each other cam, a motor operable for rough air simulation, and a second set of irregular cams mounted in pairs and driven from said motor and disposed in alinement with said pairs of free cams respectively, one of said sets of cams arranged to support said pilot's station, all said cams having irregular cam surfaces so that either cam of a pair of said free cams may be engaged by and disengaged from the corresponding driving cam for causing relative casual movement between said sets of cams and a random movement of said station.

8. In aircraft training apparatus, a motor operable for rough air simulation, a set of actuating cams driven from said motor, another set of cams mounted for free wheeling about an axis substantially parallel to the axis of said actuating cams, the contours of all said cams being irregular and each free wheeling cam arranged to be individually driven by and according to casual contact with a corresponding actuating cam for producing relative motion between the free and actuating cams, and a pilot's station operatively related to one of said sets of cams whereby operation of said motor causes random movement of said station to simulate movement under rough air conditions.

9. In aircraft training apparatus for simulating rough air conditions, the combination of a frame, supporting structure for a pilot's station mounted on said frame, a resilient connection between one end of said supporting structure and said frame arranged so that the opposite end of said structure is in floating relation to said frame and said structure can rock about its longitudinal central axis and also about a transverse axis through said connection, an operating motor, and a plurality of coacting cams of irregular contour some of which are driven by said motor and others connected to the floating end of said structure arranged so that said structure is tilted and rocked with respect to said frame in accordance with relative displacement of the axes of said cams.

10. In aircraft training apparatus for simulating rough air conditions, the combination of a frame, supporting structure for a pilot's station mounted on said frame, a resilient connection between one part of said supporting structure and said frame arranged so that another part of said structure is in floating relation to said frame and said structure can rock about its longitudinal central axis and also about a transverse axis through said connection, said resilient connection also allowing a limited amount of sway of said structure along said longitudinal axis, an operating motor, and two sets of coacting cams of irregular contour, one set being driven by said motor and the other set connected to the floating part of said structure, the axes of the respective sets of cams having a relative longitudinal displacement for producing a longitudinal sway component and arranged so that said structure is tilted and rocked with respect to said frame in accordance with relative displacement of the cam axes by operation of said motor.

RICHARD CARL DEHMEL.

REFERENCES CITED

The following references are of record in the file of this patent:

UNITED STATES PATENTS

| Number | Name | Date |
|---|---|---|
| 1,372,408 | Dyson | Mar. 22, 1921 |
| 2,099,857 | Link | Nov. 23, 1937 |
| 2,123,927 | Bell | July 19, 1938 |
| 2,336,711 | Barber | Dec. 14, 1943 |
| 2,366,603 | Dehmel | Jan. 2, 1945 |
| 2,396,660 | Kanter | Mar. 19, 1946 |

FOREIGN PATENTS

| Number | Country | Date |
|---|---|---|
| 548,093 | Great Britain | 1942 |